United States Patent
Hojo

(10) Patent No.: US 10,529,997 B2
(45) Date of Patent: Jan. 7, 2020

(54) REDOX FLOW BATTERY INCLUDING PERMEATION PREVENTER FOR RETAINING INSOLUBLE ACTIVE MATERIAL IN ELECTROLYTIC SOLUTION CONTAINER

(71) Applicant: Panasonic Intellectual Property Management Co., Ltd., Osaka (JP)

(72) Inventor: Nobuhiko Hojo, Tokyo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 152 days.

(21) Appl. No.: 15/796,650

(22) Filed: Oct. 27, 2017

(65) Prior Publication Data

US 2018/0048004 A1 Feb. 15, 2018

Related U.S. Application Data

(63) Continuation of application No. PCT/JP2016/002604, filed on May 30, 2016.

(30) Foreign Application Priority Data

Jun. 23, 2015 (JP) .................................. 2015-125208

(51) Int. Cl.
*H01M 8/04276* (2016.01)
*H01M 8/18* (2006.01)

(52) U.S. Cl.
CPC .......... *H01M 8/04283* (2013.01); *H01M 8/18* (2013.01); *H01M 8/188* (2013.01); *Y02E 60/528* (2013.01)

(58) Field of Classification Search
CPC ....... H01M 8/0428; H01M 8/18; H01M 8/188
(Continued)

(56) References Cited

U.S. PATENT DOCUMENTS

| 2004/0191623 A1* | 9/2004 | Kubata | ............... H01M 8/188 429/189 |
| 2009/0017379 A1* | 1/2009 | Inatomi | ............... B60L 50/64 429/213 |

(Continued)

FOREIGN PATENT DOCUMENTS

| JP | 2004119311 A | * | 4/2004 |
| JP | 2013037856 A | * | 2/2013 |

(Continued)

OTHER PUBLICATIONS

International Search Report of PCT application No. PCT/JP2016/002604 dated Aug. 2, 2016.

*Primary Examiner* — Sean P Cullen
(74) *Attorney, Agent, or Firm* — McDermott Will & Emery LLP

(57) ABSTRACT

A redox flow battery includes first and second electrodes, a separator separating the first and second electrodes, an active material, an electrolytic solution containing a redox species, and a circulation mechanism. The active material is insoluble in the electrolytic solution. The circulation mechanism circulates the electrolytic solution between the first electrode and the active material. The redox species performs oxidation and reduction at the first electrode and is oxidized and reduced by the active material. The circulation mechanism includes an electrolytic solution container containing the active material and a permeation preventing unit. The electrolytic solution is brought into contact with the active material in the electrolytic solution container, and the redox species is oxidized and reduced by the active material. The permeation preventing unit is disposed adjacent the outlet for the electrolytic solution of the electrolytic solution container and prevents permeation of the active material.

20 Claims, 4 Drawing Sheets

(58) Field of Classification Search
USPC .......................................................... 429/101
See application file for complete search history.

(56) References Cited

U.S. PATENT DOCUMENTS

| | | |
|---|---|---|
| 2014/0178735 A1 | 6/2014 | Wang et al. |
| 2015/0255803 A1* | 9/2015 | Delnick ................ H01M 8/188 429/498 |
| 2015/0280259 A1* | 10/2015 | Anderson ............. H01M 8/188 429/409 |
| 2017/0054164 A1* | 2/2017 | Goeltz .............. H01M 8/04276 |

FOREIGN PATENT DOCUMENTS

| | | |
|---|---|---|
| JP | 2014-524124 | 9/2014 |
| WO | 2012/083233 | 6/2012 |

* cited by examiner

REDOX FLOW BATTERY INCLUDING PERMEATION PREVENTER FOR RETAINING INSOLUBLE ACTIVE MATERIAL IN ELECTROLYTIC SOLUTION CONTAINER

BACKGROUND

1. Technical Field

The present disclosure relates to a redox flow battery.

2. Description of the Related Art

Japanese Unexamined Patent Application Publication (Translation of PCT Application) No. 2014-500599 discloses a redox flow energy storage system transporting a fluid electrode composition containing an ion storage compound that can absorb or release ions.

SUMMARY

One non-limiting and exemplary embodiment provides a redox flow battery having a long cycle life.

In one general aspect, the techniques disclosed here feature a redox flow battery including a first electrode, a second electrode, a separator separating the first electrode and the second electrode, a first active material, a first electrolytic solution containing a first redox species, and a first circulation mechanism. The first active material is insoluble in the first electrolytic solution. The first circulation mechanism circulates the first electrolytic solution between the first electrode and the first active material. The first redox species performs oxidation and reduction at the first electrode and is oxidized and reduced by the first active material. The first circulation mechanism includes a first electrolytic solution container and a first permeation preventing unit. The first active material is contained in the first electrolytic solution container. The first electrolytic solution is brought into contact with the first active material in the first electrolytic solution container to oxidize and reduce the first redox species by the first active material. The first permeation preventing unit is disposed adjacent an outlet for the first electrolytic solution of the first electrolytic solution container. The first permeation preventing unit prevents permeation of the first active material.

According to the present disclosure, a redox flow battery having a long cycle life can be achieved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will now be described with reference to the drawings.

The viewpoint of the present inventor will now be described.

In a known redox flow battery, an electrolytic solution containing a compound (active material) that can absorb or release ions is transported. Herein, the viscosity of an electrolytic solution increases with the content of an active material in the electrolytic solution. Consequently, in circulation of the electrolytic solution, clogging of an electrode or pipe readily occurs, leading to a risk of shortening the cycle life.

However, if the content of the active material in the electrolytic solution is decreased for preventing clogging of an electrode or pipe, an increase of the energy density becomes difficult.

Based on the viewpoints described above, the present inventor created the structure of the present disclosure.

Embodiment 1

Figure 1:
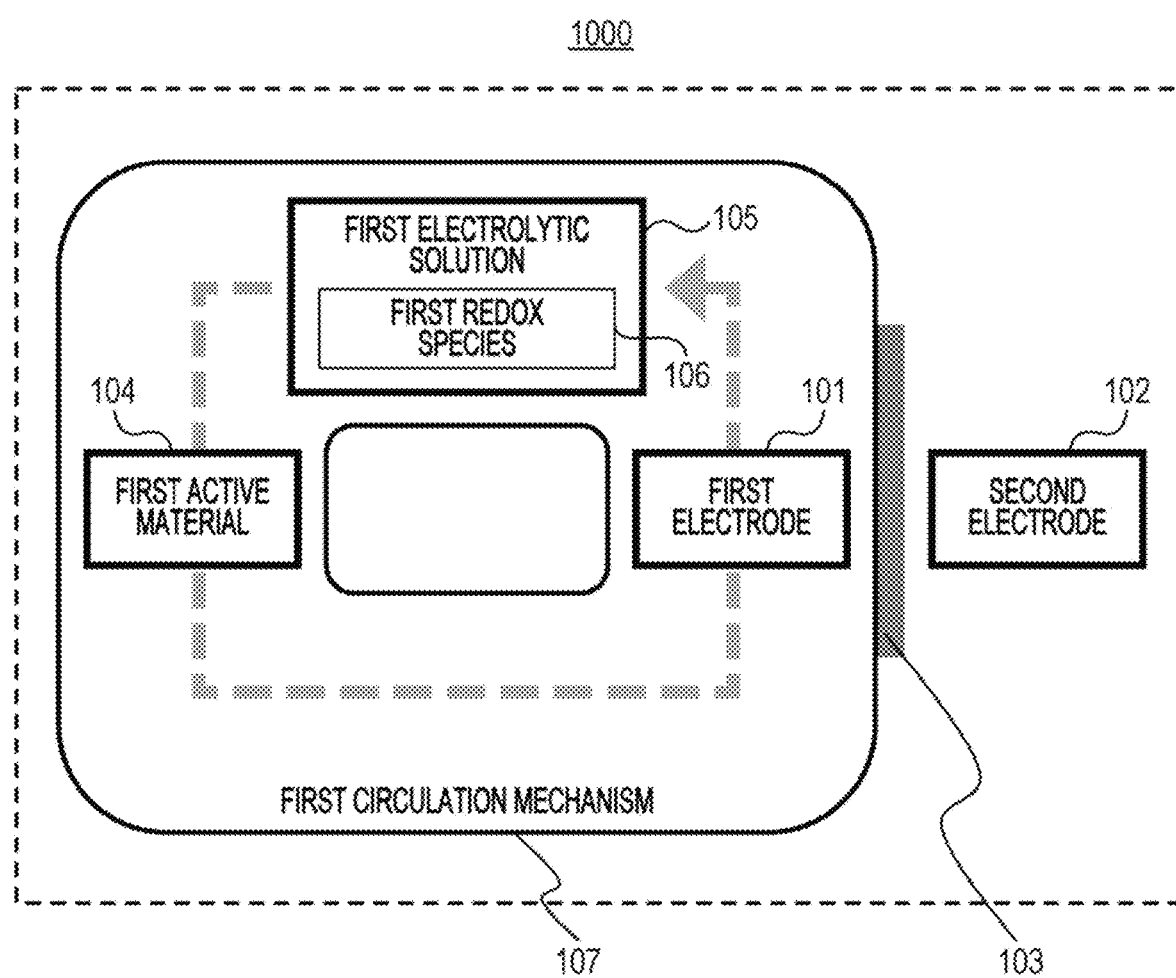
FIG. 1 is a block diagram schematically illustrating a structure of the redox flow battery according to Embodiment 1.

FIG. 1 is a block diagram schematically illustrating a structure of the redox flow battery 1000 according to Embodiment 1.

The redox flow battery 1000 according to Embodiment 1 includes a first electrode 101, a second electrode 102, a separator 103, a first active material 104, a first electrolytic solution 105, and a first circulation mechanism 107.

The separator 103 separates the first electrode 101 and the second electrode 102.

The first electrolytic solution 105 contains a first redox species 106.

The first circulation mechanism 107 circulates the first electrolytic solution 105 between the first electrode 101 and the first active material 104.

The first active material 104 is insoluble in the first electrolytic solution 105.

The first redox species 106 performs oxidation and reduction at the first electrode 101.

The first redox species 106 is oxidized and reduced by the first active material 104.

According to the structure described above, for example, a redox flow battery having a structure utilizing an active material but not circulating the active material itself can be achieved. Consequently, a high energy density and a long cycle life are compatible. That is, for example, a powdery active material having a high capacity against charging and discharging reactions can be used as the first active material. Consequently, a high capacity can be achieved. This allows only the first electrolytic solution containing a first redox species to circulate without circulating the powdery active material itself. Accordingly, occurrence, for example, clogging of an electrode or pipe by the powdery active material can be suppressed, and a redox flow battery having a long cycle life can be achieved.

For example, the first electrolytic solution 105 is brought into contact with the first electrode 101 to oxidize or reduce the first redox species 106 by the first electrode 101.

For example, the first electrolytic solution 105 is brought into contact with the first active material 104 to oxidize or reduce the first redox species 106 by the first active material 104.

In addition, in the redox flow battery 1000 according to Embodiment 1, the redox potential region of the first redox species 106 may partially overlap the redox potential region of the first active material 104.

According to the structure described above, the first active material 104 can oxidize and reduce the first redox species 106.

In the redox flow battery 1000 according to Embodiment 1, the upper limit of the redox potential region of the first redox species 106 may be higher than that of the redox potential region of the first active material 104.

In such a case, the lower limit of the redox potential region of the first redox species 106 may be lower than that of the redox potential region of the first active material 104.

The structure described above can sufficiently (e.g., almost 100%) use the capacity of the first active material 104. Consequently, a redox flow battery with a higher capacity can be achieved.

The first redox species 106 may be a single redox species having multiple redox potentials.

Alternatively, the first redox species 106 may be a mixture of redox species having the respective constant redox potentials.

In the redox flow battery 1000 according to Embodiment 1, the first redox species 106 may be an organic compound having oxidizing and reducing properties.

The structure described above can increase the solubility of the first redox species 106 in the first electrolytic solution 105 (e.g., nonaqueous solvent).

In the redox flow battery 1000 according to Embodiment 1, the first redox species 106 may be an organic compound having multiple redox potentials (e.g., two or more redox potentials).

Examples of the organic compound capable of performing multistep redox reactions include organic compounds having $\pi$ conjugate electron clouds, such as tetrathiafulvalene derivatives, quinone derivatives, and TCNQ.

The tetrathiafulvalene derivatives have, for example, two redox potentials of about 3.2 V and 3.7 V relative to a lithium reference potential.

In this case, a material having a redox potential of 3.2 to 3.7 V relative to a lithium reference may be used as the first active material 104.

Examples of the material having a redox potential of 3.2 to 3.7 V relative to a lithium reference include compounds containing iron, manganese, or lithium (e.g., $LiFePO_4$ and $LiMnO_2$) and compounds containing vanadium (e.g., $V_2O_5$).

The quinone derivatives have, for example, multiple redox potentials of 1 to 3 V relative to a lithium reference.

In this case, a material having a redox potential of 1 to 3 V relative to a lithium reference may be used as the first active material 104.

Examples of the material having a redox potential of 1 to 3 V relative to a lithium reference include compounds containing titanium, niobium, or lithium (e.g., $Li_4Ti_5O_{12}$ and $LiNbO_3$).

In the redox flow battery 1000 according to Embodiment 1, the first redox species 106 may be a metal-containing ion.

Examples of the metal-containing ion include ions having multiple redox potentials, such as vanadium ions, manganese ions, and molybdenum ions.

For example, vanadium ions have a wide range of reaction steps (divalence and trivalence, trivalence and tetravalence, tetravalence and pentavalence).

In the redox flow battery 1000 according to Embodiment 1, the first active material 104 may be a material having properties of reversibly occluding and releasing alkali metal ions or alkaline earth metal ions.

Examples of the alkaline earth metal include magnesium and calcium.

Examples of the alkali metal include lithium, sodium, and potassium.

In the redox flow battery 1000 according to Embodiment 1, the first active material 104 may be a material having properties of reversibly occluding and releasing lithium ions.

Alternatively, the first active material 104 may be a material having properties of reversibly occluding and releasing sodium ions or magnesium ions.

The use of a material that can reversibly occluding and releasing lithium, sodium, or magnesium makes the material design of the positive electrode active material easy and also can achieve a high capacity.

Examples of the material that can reversibly occlude and release lithium, sodium, or magnesium include transition metal oxides, fluorides, polyanions, fluorinated polyanions, and transition metal sulfides.

The usable transition metal oxides are oxides containing nickel, cobalt, manganese, vanadium, or iron. Examples of the transition metal oxide that occludes and releases lithium include lithium cobaltate, lithium nickelate, lithium manganate, nickel-cobalt-manganese solid solution containing lithium, and nickel-manganese solid solutions containing lithium. Examples of the transition metal oxide that occludes and releases sodium include sodium cobaltate, sodium nickelate, sodium manganate, and nickel-cobalt-manganese solid solutions containing sodium represented by $Na_x[Me1]_yO_2$ (where $0<x\leq1$, $0.95\leq y<1.05$, and [Me1] contains at least one selected from the group consisting of Fe, Mn, Ni, Co, Cr, and Ti).

Examples of the transition metal fluoride include $LiFeF_3$, $LiMnF_3$, $LiNiF_3$, $NaFeF_3$, $NaMnF_3$, and $NaNiF_3$.

Examples of the polyanion or fluorinated polyanion include Li-containing compounds, such as $LiFePO_4$, $LiMnPO_4$, $Li_2FeSiO_4$, and $Li_2MnSiO_4$; Na-containing compounds, such as $Na[Me2]PO_4$, $Na_3[Me2]_2(PO_4)_3$, $Na_4[Me2]_3(PO_4)_2P_2O_7$, $Na_2[Me2]PO_4F$, and $Na_3[Me2]_2(PO_4)_2F_3$, where [Me2] contains at least one selected from the group consisting of Fe, Mn, Ni, Co, Ti, V, and Mo; and Mg-containing compounds, such as $MgFeSiO_4$.

Examples of the transition metal sulfide include $Ni_3S_2$, $FeS_2$, $TiS_2$, and molybdenum sulfide. Use of a transition metal oxide containing Li or Na can reduce the manufacturing cost and can increase the average discharge voltage.

The first active material 104 may be an active material powder. When the first active material 104 in an unprocessed powder form is put in a tank, the production process can be simplified, and the manufacturing cost can be reduced.

Alternatively, the first active material 104 may be an active material in a pellet form (e.g., a powder molded into a pellet). When the first active material 104 in a pellet form is put in a tank, the production process can be simplified, and the manufacturing cost can be reduced.

Alternatively, the first active material 104 may be an active material solidified into a pellet form with a binder.

Examples of the binder include polyvinylidene fluoride, vinylidene fluoride-hexafluoropropylene copolymers, vinylidene fluoride-tetrafluoroethylene copolymers, polytetrafluoroethylene, carboxymethyl cellulose, polyacrylic acid, styrene-butadiene copolymer rubber, polypropylene, polyethylene, and polyimide.

Alternatively, the first active material 104 may be an active material in a film form immobilized on metal foil.

Alternatively, the first active material 104 may be a mixture of an active material and a conductive auxiliary agent or an ion conductor.

Examples of the conductive auxiliary agent include carbon materials (e.g., carbon black, graphite, and acetylene black) and electrically conductive polymer compounds (e.g., polyaniline, polypyrrole, and polythiophene).

Examples of the ion conductor include gel electrolytes (e.g., polymethyl methacrylate and methyl polymethacrylate) and solid electrolytes (e.g., polyethylene oxide). The active material may be used by being solidified with these ion conductors.

The first electrode 101 may be a positive electrode, and the second electrode 102 may be a negative electrode.

If the second electrode 102 has a relatively high potential, the first electrode 101 can serve as a negative electrode.

That is, the first electrode 101 may be a negative electrode, and the second electrode 102 may be a positive electrode.

The first electrode 101 may have a surface functioning as a reaction field of the first redox species 106.

In such a case, the material for the first electrode 101 can be stable against the solvent and supporting electrolyte salt of the first electrolytic solution 105. The material for the first electrode 101 can also be stable against an electrochemical reaction as an electrode reaction. For example, a metal (e.g., alumina or stainless steel) or a carbon material can be used as the first electrode 101.

The first electrode 101 may have a structure having an increased surface area (e.g., mesh, nonwoven fabric, surface-roughened plate, or sintered porous material). In such a case, the first electrode 101 has an enlarged specific surface area. Consequently, the oxidization reaction or reduction reaction of the first redox species 106 can further readily proceed.

In the redox flow battery 1000 according to Embodiment 1, the second electrode 102 may be an alkali metal or an alkaline earth metal.

In the redox flow battery 1000 according to Embodiment 1, the second electrode 102 may be made of lithium.

Alternatively, the second electrode 102 may have a structure including a current collector and an active material disposed on the current collector. In such a case, for example, a high-capacity active material can be used.

As the active material of the second electrode 102, a compound having properties of reversibly occluding and releasing alkali metal ions or alkaline earth metal ions can be used.

Alternatively, an alkali metal using its dissolution and deposition reaction can be used as the active material of the second electrode 102. Examples of the alkali metal include lithium, sodium, and potassium.

Alternatively, an alkaline earth metal using its dissolution and deposition reaction can be used as the active material of the second electrode 102. Examples of the alkaline earth metal include magnesium and calcium.

In a case where lithium, sodium, or magnesium is used as the active material of the second electrode 102, dissolution and deposition of a metal negative electrode to be readily controlled and a high capacity can be achieved.

In known batteries, these metals dendritically deposit. Consequently, for example, short-circuiting occurs between the dendritic deposition portion and the active material of the counter electrode, causing an instantaneous thermal reaction between the positive and negative electrodes. As a result, problems of decreasing the safety or deteriorating the cycle characteristics occur.

In the structure according to Embodiment 1, the first active material 104 does not need to be disposed at the position facing the second electrode 102 with the separator 103 therebetween. For example, the first active material 104 can be arranged at a position (e.g., in a tank) apart from the second electrode 102.

Accordingly, in the structure according to Embodiment 1, even if a dendritic deposition portion of the active material of the second electrode 102 goes over the separator 103 and comes into contact with the first electrode 101 not containing a first active material 104, a high thermal reaction does not occur.

Accordingly, in the structure according to Embodiment 1, the problems of decreasing the safety or deteriorating the cycle characteristics in known batteries are solved.

The first electrolytic solution 105 may be, for example, a nonaqueous electrolytic solution.

In such a case, the nonaqueous electrolytic solution is composed of, for example, an electrolyte salt and a nonaqueous solvent dissolving the electrolyte salt.

Examples of the electrolyte salt include an electrolyte salt composed of an alkali metal ion and an anion and an electrolyte salt composed of an alkaline earth metal ion and an anion.

Examples of the anion include halide anions, perchlorate anion, trifluoromethanesulfonate anion, tetrafluorinated borate anion ($BF_4^-$), hexafluorinated phosphate anion ($PF_6^-$), bis(trifluoromethanesulfonyl)imide anion, bis(perfluoroethylsulfonyl)imide anion, and bis(fluoromethanesulfonyl)imide anion. These anions may be used in combination of two or more thereof.

The supporting electrolyte salt may be an alkali metal salt or an alkaline earth metal or may be a salt containing an organic cation, such as a quaternary ammonium cation.

As the nonaqueous solvent, a generally known nonaqueous solvent that can be used for a nonaqueous secondary battery or a nonaqueous electric double-layer capacitor can be used.

That is, examples of the nonaqueous solvent include cyclic and chain carbonates, cyclic and chain esters, cyclic and chain ethers, nitriles, cyclic and chain sulfones, and cyclic and chain sulfoxides.

Examples of the cyclic carbonate include ethylene carbonate, propylene carbonate, and fluorinated ethylene carbonate. These cyclic carbonates have very high specific dielectric constants. Herein, propylene carbonate has a solidification point of $-49°$ C., which is lower than that of ethylene carbonate. Accordingly, in the case of using propylene carbonate, the redox flow battery can be operated even in a low temperature environment.

Examples of the chain carbonate include dimethyl carbonate, diethyl carbonate, and methyl ethyl carbonate.

Examples of the cyclic ester include γ-butyrolactone. The cyclic esters have very high specific dielectric constants.

Examples of the chain ester include methyl propionate, methyl acetate, ethyl acetate, and their fluorinated derivatives.

Examples of the cyclic ether include dioxane and dioxolane.

Examples of the chain ether include monoglyme, diglyme, triglyme, and tetraglyme.

The solvents exemplified above can be used as unsubstituted solvents. Alternatively, the solvents exemplified above can be used as fluoriated solvents where a part of hydrogen atoms is substituted by a fluorine atom.

These nonaqueous solvents may be used alone or as a mixture of two or more thereof.

The separator 103 may be a microporous membrane (porous material) that is used in known secondary batteries.

Alternatively, the separator 103 may be a porous membrane, such as glass paper where glass fibers are woven in nonwoven fabric.

Alternatively, the separator 103 may be a diaphragm having ionic conductivity. For example, the separator 103 may be, for example, an ion exchange resin membrane (e.g., cation exchange membrane or anion exchange membrane) or a solid electrolyte.

The first circulation mechanism 107 may include, for example, a pipe, a tank, a pump, and a valve.

An example of the first circulation mechanism 107 is the structure in Embodiment 2 described below.

Explanation of Charging and Discharging Process

The charging and discharging process of the redox flow battery 1000 according to Embodiment 1 will now be described.

The charging and discharging process will be specifically described with reference to the following operation example.

That is, in this operation example, the first electrode 101 is a positive electrode and is made of carbon black.

In this operation example, the first active material 104 is lithium iron phosphate ($LiFePO_4$).

In this operation example, the first electrolytic solution 105 is a nonaqueous electrolytic solution where $LiBF_4$ is dissolved in a nonaqueous solvent.

In this operation example, the first redox species 106 is tetrathiafulvalene (TTF).

In this operation example, the second electrode 102 is a negative electrode and is made of lithium metal.

Explanation of Charging Process

A charging reaction will now be described.

Charging is performed by applying a voltage between the first electrode 101 and the second electrode 102.

Reaction on Negative Electrode Side

In the second electrode 102 serving as a negative electrode, a reduction reaction occurs. That is, the negative electrode is converted to the changed state.

For example, in this operation example, the following reaction occurs:

$$Li^+ + e^- \rightarrow Li.$$ 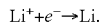

Reaction on Positive Electrode Side

The application of a voltage oxidizes the first redox species 106 on the surface of the first electrode 101 serving as a positive electrode. That is, the first redox species 106 is converted to the charged state.

For example, in this operation example, the following reaction occurs:

$$TTF \rightarrow TTF^+ + e^-.$$ 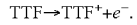

The first circulation mechanism 107 moves (supplies) the first redox species 106 oxidized by the first electrode 101 to the place where the first active material 104 is disposed.

Consequently, the first active material 104 is converted to the charged state by the first redox species 106. In other words, the first redox species 106 is converted to the discharged state by the first active material 104. That is, the first redox species 106 is reduced by the first active material 104.

For example, in this operation example, the following reactions occur:

$$LiFePO_4 \rightarrow Li_{(1-x)}FePO_4 + xLi^+ + xe^-, \text{ where } 0 < x \leq 1,$$ 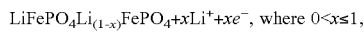

$$TTF^+ + e^- \rightarrow TTF.$$ 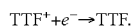

The first circulation mechanism 107 moves (supplies) the first redox species 106 reduced by the first active material 104 to the place where the first electrode 101 is disposed.

As described above, the first redox species 106 is not modified in the whole reaction including circulation.

The first active material 104 disposed apart from the first electrode 101 is converted to the charged state.

The charging reaction described above can proceed until the first active material 104 is completely charged or the second electrode 102 serving as a negative electrode is completely charged.

Explanation of Discharging Process

A discharging reaction from the full charge will now be described.

In full charge, the second electrode 102 serving as a negative electrode and the first active material 104 are in a charged state.

Power is taken out from between the first electrode 101 and the second electrode 102.

Reaction on Negative Electrode Side

At the second electrode 102 serving as a negative electrode, an oxidation reaction occurs. That is, a negative electrode is converted to the discharged state.

For example, in this operation example, the following reaction occurs:

$$Li \rightarrow Li^+ + e^-.$$ 

Reaction on Positive Electrode Side

The first redox species 106 is reduced on the surface of the first electrode 101 serving as a positive electrode. That is, the first redox species 106 is converted to the discharged state.

For example, in this operation example, the following reaction occurs:

$$TTF^+ + e^- \rightarrow TTF.$$ 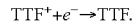

The first circulation mechanism 107 moves (supplies) the first redox species 106 reduced by the first electrode 101 to the place where the first active material 104 is disposed.

Consequently, the first active material 104 is converted to the discharged state by the first redox species 106. In other words, the first redox species 106 is converted to the charged state by the first active material 104. That is, the first redox species 106 is oxidized by the first active material 104.

For example, in this operation example, the following reactions occur:

$$TTF \rightarrow TTF^+ + e^-,$$ 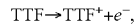

$$Li_{(1-x)}FePO_4 + xLi^+ + xe^- \rightarrow LiFePO_4, \text{ where } 0 < x \leq 1.$$ 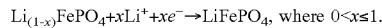

The first circulation mechanism 107 moves (supplies) the first redox species 106 oxidized by the first active material 104 to the place where the first electrode 101 is disposed.

As described above, the first redox species 106 is not modified in the whole reaction including circulation.

The first active material 104 disposed apart from the first electrode 101 is converted to the discharged state.

The discharging reaction described above can proceed until the first active material 104 is completely discharged or the second electrode 102 serving as a negative electrode is completely discharged.

As in one example of the charging and discharging process described above, in the charged state of a battery, the first redox species 106 may be oxidized at the first electrode 101 and be reduced by the first active material 104. In such a case, in the discharged state of the battery, the first redox species 106 may be reduced at the first electrode 101 and be oxidized by the first active material 104.

Embodiment 2

Embodiment 2 will now be described. The same explanation as that in Embodiment 1 will be appropriately omitted.

Figure 2:
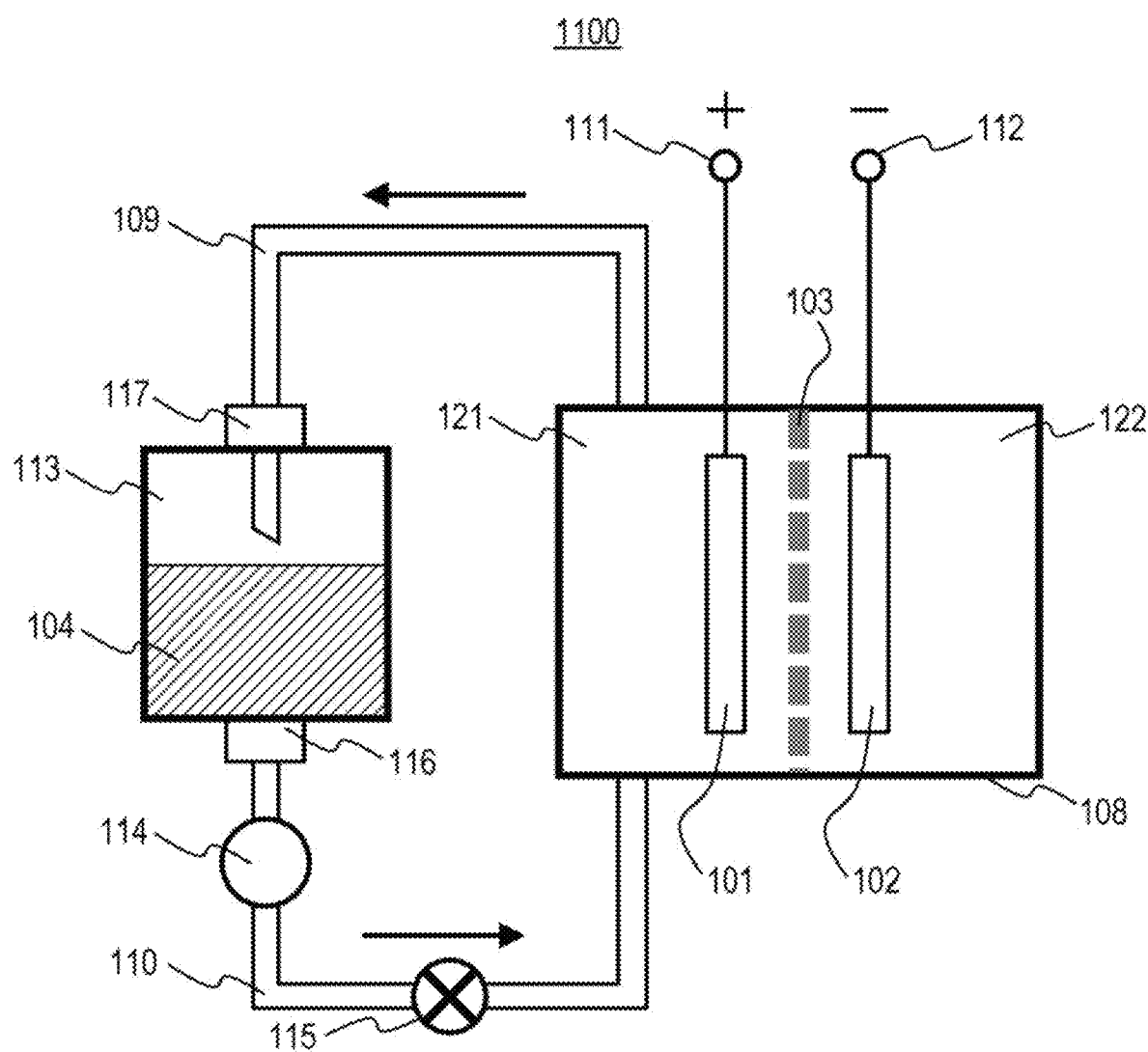
FIG. 2 is a schematic diagram illustrating a structure of the redox flow battery according to Embodiment 2.

FIG. 2 is a schematic diagram illustrating a structure of the redox flow battery 1100 according to Embodiment 2.

The redox flow battery 1100 according to Embodiment 2 further includes the following structure in addition to the structure of the redox flow battery 1000 according to Embodiment 1.

That is, in the redox flow battery 1100 according to Embodiment 2, the first circulation mechanism 107 includes a first electrolytic solution container 113.

The first active material 104 is contained in the first electrolytic solution container 113.

In the first electrolytic solution container 113, the first active material 104 is brought into contact with the first electrolytic solution 105 and oxidizes or reduces the first redox species 106.

According to the structure described above, in the first electrolytic solution container 113, the first electrolytic solution 105 can be brought into contact with the first active material 104. Consequently, the oxidization reaction or the reduction reaction of the first redox species 106 by the first active material 104 can be more efficiently performed.

In Embodiment 2, the first electrolytic solution container 113 may be, for example, a tank.

The first electrolytic solution container 113 may contain, for example, the first electrolytic solution 105 containing the first redox species 106 in the gaps of the first active material 104 put in the first electrolytic solution container 113.

In addition, as shown in FIG. 2, the redox flow battery 1100 according to Embodiment 2 may include an electrochemical reaction unit 108, a positive electrode terminal 111, and a negative electrode terminal 112.

The electrochemical reaction unit 108 is divided into a positive electrode chamber 121 and a negative electrode chamber 122 by the separator 103.

In the positive electrode chamber 121, an electrode (in the example shown in FIG. 2, the first electrode 101) serving as a positive electrode is disposed.

The positive electrode terminal 111 is connected to the electrode serving as the positive electrode.

In the negative electrode chamber 122, an electrode (in the example shown in FIG. 2, the second electrode 102) serving as a negative electrode is disposed.

The negative electrode terminal 112 is connected to the electrode serving as the negative electrode.

As shown in FIG. 2, in the redox flow battery 1100 according to Embodiment 2, the first circulation mechanism 107 may include a pipe 109, a pipe 110, a valve 114, and a pump 115.

One end of the pipe 109 is connected to the positive electrode chamber 121 or the negative electrode chamber 122 in which the first electrode 101 is disposed (in the example shown in FIG. 2, the positive electrode chamber 121).

The other end of the pipe 109 is connected to the first electrolytic solution container 113 on the side of the inlet for the first electrolytic solution 105.

One end of the pipe 110 is connected to the first electrolytic solution container 113 on the side of the outlet for the first electrolytic solution 105.

The other end of the pipe 110 is connected to the positive electrode chamber 121 or the negative electrode chamber 122 in which the first electrode 101 is disposed (in the example shown in FIG. 2, the positive electrode chamber 121).

The valve 114 is disposed, for example, in the pipe 110.

The pump 115 is disposed, for example, in the pipe 109 or the pipe 110.

In the redox flow battery 1100 according to Embodiment 2, the first circulation mechanism 107 may include a first permeation preventing unit 116 (e.g., filter).

The first permeation preventing unit 116 is disposed adjacent the outlet for the first electrolytic solution 105 of the first electrolytic solution container 113.

The first permeation preventing unit 116 prevents permeation of the first active material 104.

The structure described above can prevent the first active material 104 from flowing out to the outside of the first electrolytic solution container 113. That is, the first active material 104 remains in the first electrolytic solution container 113. Consequently, a redox flow battery having a structure where the first active material 104 itself does not circulate can be achieved.

The first permeation preventing unit 116 may be disposed, for example, at the junction of the first electrolytic solution container 113 and the pipe 110.

In the redox flow battery 1100 according to Embodiment 2, the first circulation mechanism 107 may include a permeation preventing unit 117.

The permeation preventing unit 117 is disposed adjacent the inlet for the first electrolytic solution 105 of the first electrolytic solution container 113.

The permeation preventing unit 117 prevents permeation of the first active material 104.

The structure described above can further prevent the first active material 104 from flowing out to the outside of the first electrolytic solution container 113.

The permeation preventing unit 117 may be disposed, for example, at the junction of the first electrolytic solution container 113 and the pipe 109.

In the example shown in FIG. 2, the first electrolytic solution 105 contained in the first electrolytic solution container 113 passes through the first permeation preventing unit 116, the pipe 110, the valve 114, and the pump 115 and is supplied to the positive electrode chamber 121.

Consequently, the first redox species 106 dissolved in the first electrolytic solution 105 is oxidized or reduced by the first electrode 101.

Subsequently, the first electrolytic solution 105 containing the oxidized or reduced first redox species 106 passes through the pipe 109 and the permeation preventing unit 117 and is supplied to the first electrolytic solution container 113.

Consequently, the first redox species 106 dissolved in the first electrolytic solution 105 is oxidized or reduced by the first active material 104.

The valve 114 or the pump 115 controls the circulation of the first electrolytic solution 105. That is, the valve 114 or the pump 115 appropriately starts the supply of the first electrolytic solution 105, stops the supply, or controls, for example, the supply rate.

The circulation of the first electrolytic solution 105 may be controlled by a means other than the valve 114 or the pump 115.

In FIG. 2, the first electrode 101 is denoted as the positive electrode and the second electrode 102 is denoted as the negative electrode, as an example.

If the second electrode 102 has a relatively high potential, the first electrode 101 can serve as a negative electrode.

That is, the first electrode 101 may be a negative electrode, and the second electrode 102 may be a positive electrode.

The electrolytic solutions in the positive electrode chamber 121 and the negative electrode chamber 122 separated by the separator 103 may have different compositions from each other.

Alternatively, the electrolytic solutions in the positive electrode chamber 121 and the negative electrode chamber 122 may have the same composition.

Example 1

Example 1 using the redox flow battery 1100 having a structure according to Embodiment 2 will now be described.

Into a tank, 6 mg of a lithium iron phosphate (LiFePO$_4$) powder was put as the first active material 104.

Into the tank, 5 cc of a nonaqueous electrolytic solution was further put as the first electrolytic solution 105.

The solvent of the nonaqueous electrolytic solution was a nonaqueous solvent mixture of propylene carbonate and ethylene carbonate at a volume ratio of 1.1.

The nonaqueous electrolytic solution was prepared by dissolving LiBF$_4$ in the nonaqueous solvent at a concentration of 1 mol/L.

Tetrathiafulvalene (TTF) serving as the first redox species 106 was dissolved in the nonaqueous electrolytic solution serving as the first electrolytic solution 105 at a concentration of 10 mM.

The first electrode 101 was produced by press-bonding a mixture of carbon black and a PTFE binder to aluminum mesh with an area of 1 cm$^2$.

As the second electrode 102, lithium metal was used.

As the separator 103 (diaphragm), polypropylene nonwoven fabric was used. The polypropylene nonwoven fabric was impregnated with a nonaqueous electrolytic solution containing 1 mol/L LiBF$_4$.

The tank and the first electrode 101 were connected to each other with a silicon tube such that the nonaqueous electrolytic solution circulates.

The redox flow battery of Example 1 was produced by the method described above.

Comparative Example 1

Comparative Example 1 will now be described.

The lithium iron phosphate (LiFePO$_4$) powder serving as the first active material 104 was not put in the tank.

Except for the above, a redox flow battery of Comparative Example 1 was produced as in Example 1.
Charge and Discharge Test In each of the redox flow batteries of Example 1 and Comparative Example 1, the nonaqueous electrolytic solution was sent between the tank and the first electrode 101 at a rate of 100 cc/min with a tube pump.

The redox flow batteries of Example 1 and Comparative Example 1 were charged at a constant current of 0.1 mA for 3 hours.

Subsequently, the redox flow batteries of Example 1 and Comparative Example 1 were discharged at a constant current of 0.1 mA down to 2.5 V.

The redox flow battery of Comparative Example 1 was capable of being discharged for about 2 hours and 15 minutes.

In contrast, the redox flow battery of Example 1 was capable of being discharged for about 8 hours and 30 minutes. That is, it was demonstrated that the discharge capacity was increased in Example 1 compared to Comparative Example 1.

The redox flow batteries were subsequently charged at a constant current of 0.1 mA up to 4 V.

The redox flow battery of Comparative Example 1 was capable of being charged for about 4 hours.

In contrast, the redox flow battery of Example 1 was capable of being charged for about 9 hours. That is, it was demonstrated that the charge capacity was increased in Example 1 compared to Comparative Example 1.

The above-described results demonstrate that the first redox species 106 was discharged and charged by the first active material 104.

Embodiment 3

Embodiment 3 will now be described. The same explanation as that in Embodiment 1 or 2 will be appropriately omitted.

Embodiment 3 shows a structure circulating an electrolytic solution in both the first electrode side and the second electrode side.

Figure 3:
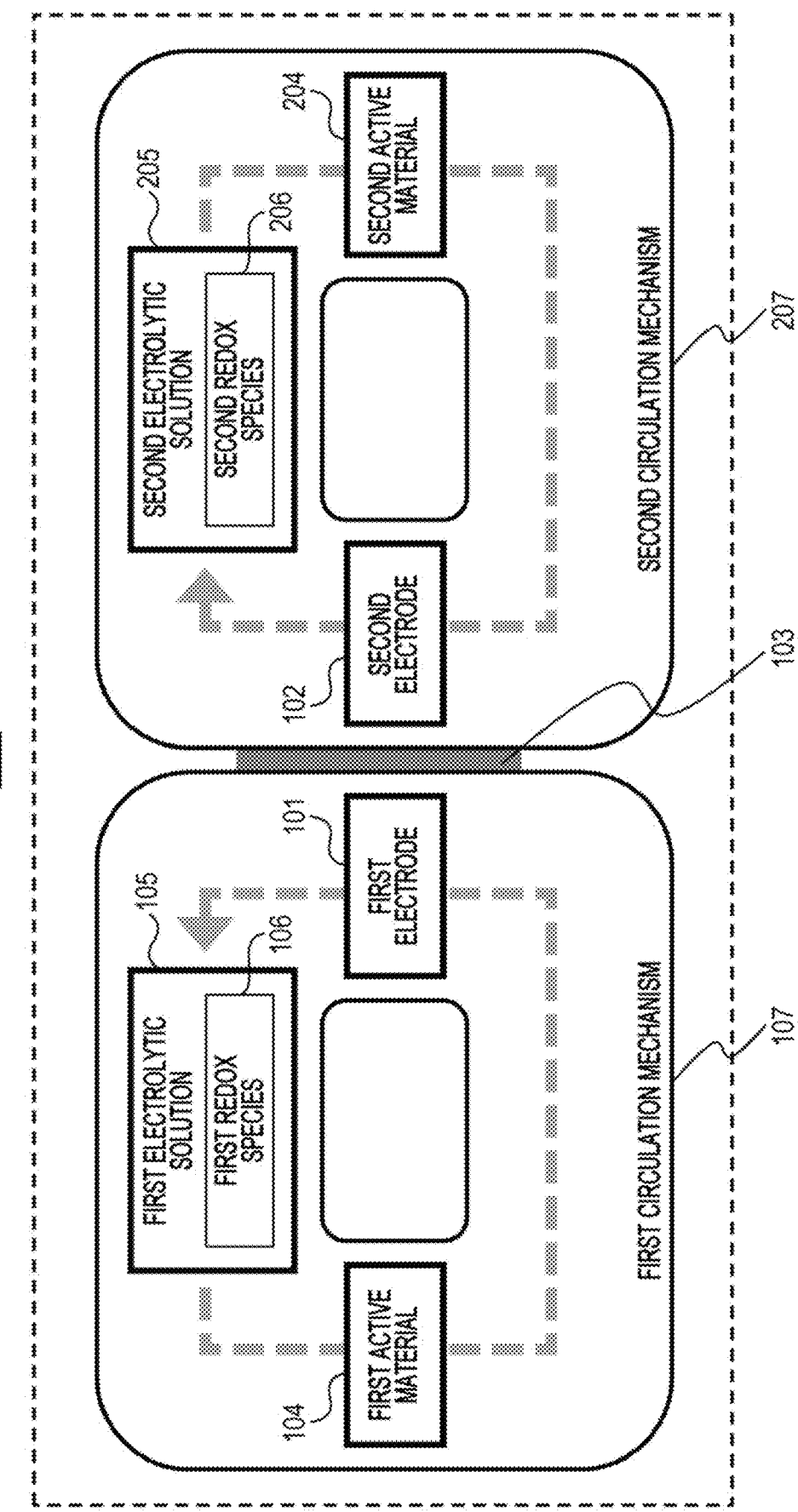
FIG. 3 is a block diagram schematically illustrating a structure of the redox flow battery according to Embodiment 3.

FIG. 3 is a block diagram schematically illustrating a structure of the redox flow battery 2000 according to Embodiment 3.

The redox flow battery 2000 according to Embodiment 3 includes the following structure in addition to the structure of the redox flow battery 1000 according to Embodiment 1.

That is, the redox flow battery 2000 according to Embodiment 3 includes a second active material 204, a second electrolytic solution 205, and a second circulation mechanism 207.

The second electrolytic solution 205 contains a second redox species 206.

The second circulation mechanism 207 circulates the second electrolytic solution 205 between the second electrode 102 and the second active material 204.

The second active material 204 is insoluble in the second electrolytic solution 205.

The second redox species 206 performs oxidation and reduction at the second electrode 102.

The second redox species 206 is oxidized and reduced by the second active material 204.

According to the structure described above, for example, a high-capacity powdery active material can be used as the second active material 204 in charging and discharging reactions. Consequently, a higher capacity can be achieved. On this occasion, only the second electrolytic solution 205 containing the second redox species 206 can be circulated without circulating the powdery active material itself. Accordingly, occurrence of, for example, clogging of an electrode or pipe by the powdery active material can be suppressed. Accordingly, a redox flow battery having a longer cycle life can be achieved.

For example, the second electrolytic solution 205 is brought into contact with the second electrode 102 to oxidize or reduce the second redox species 206 by the second electrode 102.

For example, the second electrolytic solution 205 is brought into contact with the second active material 204 to oxidize or reduce the second redox species 206 by the second active material 204.

In addition, in the redox flow battery 2000 according to Embodiment 3, the redox potential region of the second redox species 206 may partially overlap the redox potential region of the second active material 204.

According to the structure described above, the second active material 204 can oxidize and reduce the second redox species 206.

In the redox flow battery 2000 according to Embodiment 3, the upper limit of the redox potential region of the second redox species 206 may be higher than that of the redox potential region of the second active material 204.

In such a case, the lower limit of the redox potential region of the second redox species 206 may be lower than that of the redox potential region of the second active material 204.

The structure described above can sufficiently (e.g., almost 100%) use the capacity of the second active material 204. Consequently, a redox flow battery with a higher capacity can be achieved.

The second redox species 206 may be a single redox species having multiple redox potentials.

Alternatively, the second redox species 206 may be a mixture of redox species having the respective constant redox potentials.

In the redox flow battery 2000 according to Embodiment 3, the second redox species 206 may be an organic compound having oxidizing and reducing properties.

The structure described above can increase the solubility of the second redox species 206 in the second electrolytic solution 205 (e.g., nonaqueous solvent).

In the redox flow battery 2000 according to Embodiment 3, the second redox species 206 may be an organic compound having multiple redox potentials (e.g., two or more redox potentials).

In the redox flow battery 2000 according to Embodiment 3, the second active material 204 may be a material having properties of reversibly occluding and releasing alkali metal ions or alkaline earth metal ions.

In the redox flow battery 2000 according to Embodiment 3, the second active material 204 may be a material having properties of reversibly occluding and releasing lithium ions.

The first electrode 101 may be a positive electrode, and the second electrode 102 may be a negative electrode.

If the second electrode 102 has a relatively high potential, the first electrode 101 can serve as a negative electrode.

That is, an electrode having a relatively high potential serves as a positive electrode, and an electrode having a relatively low potential serves as a negative electrode.

That is, the first electrode 101 may be a negative electrode, and the second electrode 102 may be a positive electrode.

In Embodiment 3, the material for the second electrode 102 may be, for example, the material shown as that for the first electrode 101 in Embodiment 1.

The material for the second active material 204 may be, for example, the material shown as that for the first active material 104 in Embodiment 1.

The material for the second electrolytic solution 205 may be, for example, the material shown as that for the first electrolytic solution 105 in Embodiment 1.

The material for the second redox species 206 may be, for example, the material shown as that for the first redox species 106 in Embodiment 1.

The second circulation mechanism 207 may include, for example, a pipe, a tank, a pump, and a valve.

An example of the second circulation mechanism 207 is the structure in Embodiment 4 described below.

The first electrolytic solution 105 and the second electrolytic solution 205 may have different compositions from each other.

Alternatively, the first electrolytic solution 105 and the second electrolytic solution 205 may have the same composition.

Explanation of Charging and Discharging Process

The charging and discharging process of the redox flow battery 2000 according to Embodiment 3 will now be described.

The charging and discharging process will be specifically described with reference to the following operation example.

That is, in this operation example, the first electrode 101 is a positive electrode and is made of carbon black.

In this operation example, the first active material 104 is lithium iron phosphate ($LiFePO_4$).

In this operation example, the first electrolytic solution 105 is a nonaqueous electrolytic solution where $LiBF_4$ is dissolved in a nonaqueous solvent.

In this operation example, the first redox species 106 is tetrathiafulvalene (TTF).

In this operation example, the second electrode 102 is a negative electrode and is made of carbon black.

In this operation example, the second active material 204 is $Li_4Ti_5O_{12}$.

In this operation example, the second electrolytic solution 205 is a nonaqueous electrolytic solution where $LiBF_4$ is dissolved in a nonaqueous solvent.

In this operation example, the second redox species 206 is 9,10-phenanthrenequinone (Quinone).

Explanation of Charging Process

The charging reaction will now be described.

Charging is performed by applying a voltage between the first electrode 101 and the second electrode 102.

Reaction on Negative Electrode Side

The application of a voltage reduces the second redox species 206 on the surface of the second electrode 102 serving as a negative electrode. That is, the second redox species 206 is converted to the charged state.

For example, in this operation example, the following reaction occurs:

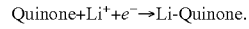

Quinone+$Li^+$+$e^-$→Li-Quinone.

The second circulation mechanism 207 moves (supplies) the second redox species 206 reduced by the second electrode 102 to the place where the second active material 204 is disposed.

Consequently, the second active material 204 is converted to the charged state by the second redox species 206. In other words, the second redox species 206 is converted to the discharged state by the second active material 204. That is, the second redox species 206 is oxidized by the second active material 204.

For example, in this operation example, the following reactions occur:

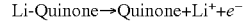

Li-Quinone→Quinone+$Li^+$+$e^-$

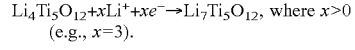

$Li_4Ti_5O_{12}$+$xLi^+$+$xe^-$→$Li_7Ti_5O_{12}$, where $x>0$ (e.g., $x=3$).

The second circulation mechanism 207 moves (supplies) the second redox species 206 oxidized by second active material 204 to the place where the second electrode 102 is disposed.

As described above, the second redox species 206 is not modified in the whole reaction including circulation.

The second active material 204 disposed apart from the second electrode 102 is converted to the charged state.

Reaction on Positive Electrode Side

The application of a voltage oxidizes the first redox species 106 on the surface of the first electrode 101 serving as a positive electrode. That is, the first redox species 106 is converted to the charged state.

For example, in this operation example, the following reaction occurs:

$$TTF \rightarrow TTF^+ + e^-.$$

The first circulation mechanism 107 moves (supplies) the first redox species 106 oxidized by the first electrode 101 to the place where the first active material 104 is disposed.

Consequently, the first active material 104 is converted to the charged state by the first redox species 106. In other words, the first redox species 106 is converted to the discharged state by the first active material 104. That is, the first redox species 106 is reduced by the first active material 104.

For example, in this operation example, the following reactions occur:

$$LiFePO_4 \rightarrow Li_{(1-x)}FePO_4 + xLi^+ + xe^-, \text{ where } 0 < x \le 1,$$

$$TTF^+ + e^- \rightarrow TTF.$$

The first circulation mechanism 107 moves (supplies) the first redox species 106 reduced by first active material 104 to the place where the first electrode 101 is disposed.

As described above, the first redox species 106 is not modified in the whole reaction including circulation.

The first active material 104 disposed apart from the first electrode 101 is converted to the charged state.

The charging reaction described above can proceed until the second active material 204 is completely charged or the first active material 104 is completely charged.

Explanation of Discharging Process

The discharging reaction from full charge will now be described.

In full charge, the second active material 204 and the first active material 104 are in the charged state.

Power is taken out from between the first electrode 101 and the second electrode 102.

Reaction on Negative Electrode Side

The second redox species 206 is oxidized on the surface of the second electrode 102 serving as a negative electrode. That is, the second redox species 206 is converted to the discharged state.

For example, in this operation example, the following reaction occurs:

$$Li\text{-}Quinone \rightarrow Quinone + Li^+ + e^-.$$

The second circulation mechanism 207 moves (supplies) the second redox species 206 oxidized by second electrode 102 to the place where the second active material 204 is disposed.

Consequently, the second active material 204 is converted to the discharged state by the second redox species 206. In other words, the second redox species 206 is converted to the charged state by the second active material 204. That is, the second redox species 206 is reduced by the second active material 204.

For example, in this operation example, the following reactions occur:

$$Quinone + Li^+ + e^- \rightarrow Li\text{-}Quinone,$$

$$Li_7Ti_5O_{12} \rightarrow Li_4Ti_5O_{12} + xLi^+ + xe^-, \text{ where } x>0 \text{ (e.g., } x=3\text{).}$$

The second circulation mechanism 207 moves (supplies) the second redox species 206 reduced by the second active material 204 to the place where the second electrode 102 is disposed.

As described above, the second redox species 206 is not modified in the whole reaction including circulation.

The second active material 204 disposed apart from the second electrode 102 is converted to the discharged state.

Reaction of Positive Electrode Side

The first redox species 106 is reduced on the surface of the first electrode 101 serving as a positive electrode. That is, the first redox species 106 is converted to the discharged state.

For example, in this operation example, the following reaction occurs:

$$TTF^+ + e^- \rightarrow TTF.$$

The first circulation mechanism 107 moves (supplies) the first redox species 106 reduced by the first electrode 101 to the place where the first active material 104 is disposed.

Consequently, the first active material 104 is converted to the discharged state by the first redox species 106. In other words, the first redox species 106 is converted to the charged state by the first active material 104. That is, the first redox species 106 is oxidized by the first active material 104.

For example, in this operation example, the following reactions occur:

$$TTF \rightarrow TTF^+ + e^-,$$

$$Li_{(1-x)}FePO_4 + xLi^+ + xe^- \rightarrow LiFePO_4, \text{ where } 0 < x \le 1.$$

The first circulation mechanism 107 moves (supplies) the first redox species 106 oxidized by the first active material 104 to the place where the first electrode 101 is disposed.

As described above, the first redox species 106 is not modified in the whole reaction including circulation.

The first active material 104 disposed apart from the first electrode 101 is converted to the discharged state.

The discharging reaction described above can proceed until the second active material 204 is completely discharged or the first active material 104 is completely discharged.

As in the example of the charging and discharging process described above, in the charged state of the battery, the second redox species 206 may be reduced at the second electrode 102 and be oxidized by the second active material 204. In such a case, in the discharged state of the battery, the second redox species 206 may be oxidized at the second electrode 102 and be reduced by the second active material 204.

Embodiment 4

Embodiment 4 will now be described. The same explanation as that in Embodiment 1, 2, or 3 will be appropriately omitted.

Figure 4:
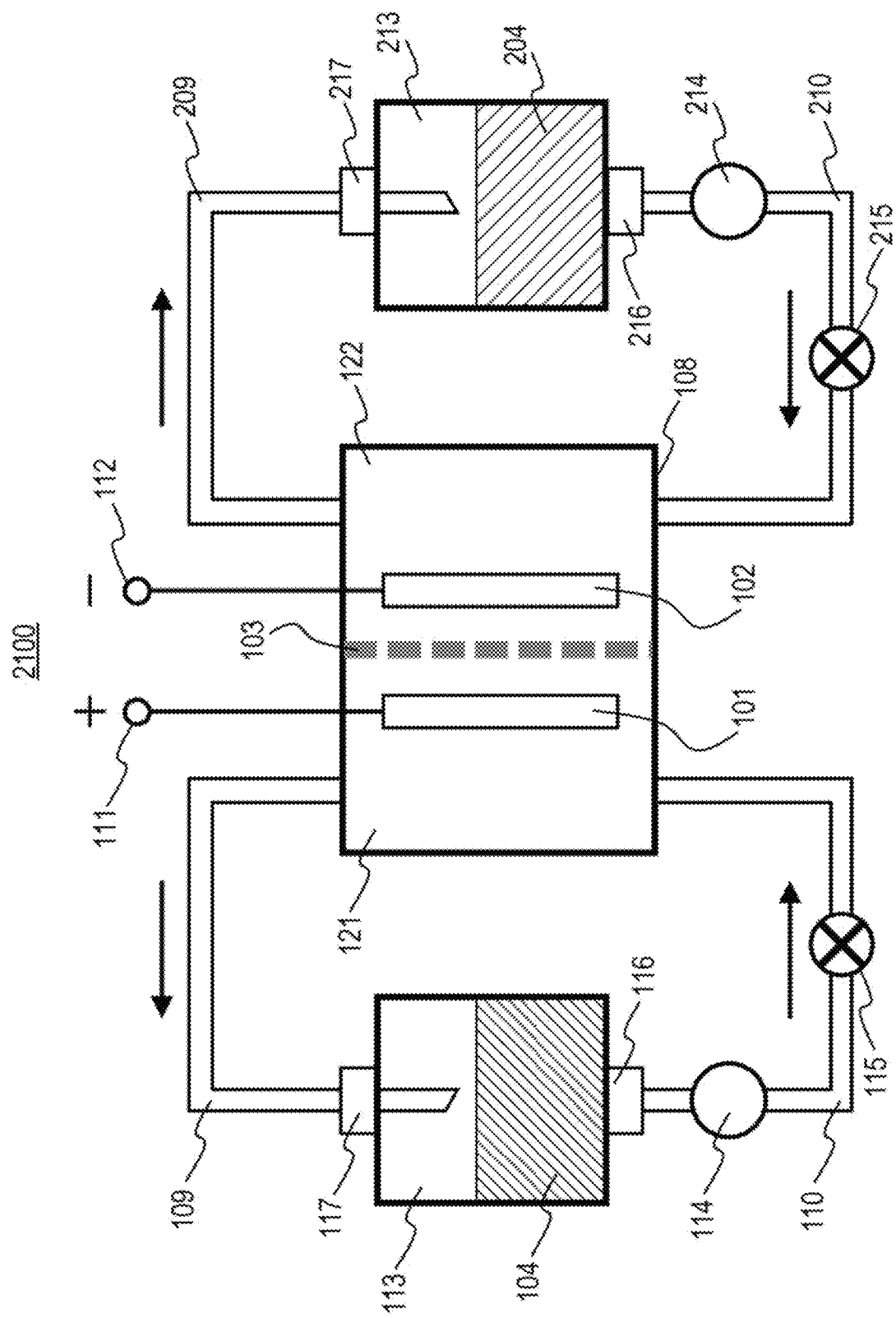
FIG. 4 is a schematic diagram illustrating a structure of the redox flow battery according to Embodiment 4.

FIG. 4 is a schematic diagram illustrating a structure of the redox flow battery 2100 according to Embodiment 4.

The redox flow battery 2100 according to Embodiment 4 includes the following structure in addition to the structure of the redox flow battery 2000 according to Embodiment 3.

The redox flow battery 2100 according to Embodiment 4 includes a first circulation mechanism 107 having the structure described in Embodiment 2.

The redox flow battery 2100 according to Embodiment 4 includes the electrochemical reaction unit 108, the positive electrode terminal 111, and the negative electrode terminal 112 described in Embodiment 2.

In the redox flow battery 2100 according to Embodiment 4, the second circulation mechanism 207 includes a second electrolytic solution container 213.

The second electrolytic solution container 213 contains a second active material 204.

In the second electrolytic solution container 213, the second electrolytic solution 205 is brought into contact with the second active material 204 to oxidize or reduce the second redox species 206 by the second active material 204.

According to the structure described above, in the second electrolytic solution container 213, the second electrolytic solution 205 can be brought into contact with the second active material 204. Consequently, the oxidization reaction or the reduction reaction of the second redox species 206 by the second active material 204 can be more certainly and efficiently performed.

In Embodiment 4, the second electrolytic solution container 213 may be, for example, a tank.

The second electrolytic solution container 213 may contain, for example, the second electrolytic solution 205 containing the second redox species 206 in the gaps of the second active material 204 put in the second electrolytic solution container 213.

As shown in FIG. 4, in the redox flow battery 2100 according to Embodiment 4, the second circulation mechanism 207 may include a pipe 209, a pipe 210, a valve 214, and a pump 215.

One end of the pipe 209 is connected to the positive electrode chamber 121 or the negative electrode chamber 122 in which the second electrode 102 is disposed (in the example shown in FIG. 4, the negative electrode chamber 122).

The other end of the pipe 209 is connected to the second electrolytic solution container 213 on the side of the inlet for the second electrolytic solution 205.

One end of the pipe 210 is connected to the second electrolytic solution container 213 on the side of the outlet for the second electrolytic solution 205.

The other end of the pipe 210 is connected to the positive electrode chamber 121 or the negative electrode chamber 122 in which the second electrode 102 is disposed (in the example shown in FIG. 4, the negative electrode chamber 122).

The valve 214 is disposed, for example, in the pipe 210.

The pump 215 is disposed, for example, in the pipe 209 or the pipe 210.

In the redox flow battery 2100 according to Embodiment 4, the second circulation mechanism 207 may include a second permeation preventing unit 216 (e.g., filter).

The second permeation preventing unit 216 is disposed adjacent the outlet for the second electrolytic solution 205 of the second electrolytic solution container 213.

The second permeation preventing unit 216 prevents permeation of the second active material 204.

According to the structure described above, the second active material 204 can be prevented from flowing out to the outside of the second electrolytic solution container 213. That is, the second active material 204 remains in the second electrolytic solution container 213. Consequently, a redox flow battery having a structure where the second active material 204 itself does not circulate can be achieved.

The second permeation preventing unit 216 may be disposed, for example, at the junction of the second electrolytic solution container 213 and the pipe 210.

In the redox flow battery 2100 according to Embodiment 4, the second circulation mechanism 207 may include a permeation preventing unit 217.

The permeation preventing unit 217 is disposed adjacent the inlet for the second electrolytic solution 205 of the second electrolytic solution container 213.

The permeation preventing unit 217 prevents permeation of the second active material 204.

According to the structure described above, the second active material 204 can be further prevented from flowing out to the outside of the second electrolytic solution container 213.

The permeation preventing unit 217 may be disposed, for example, at the junction of the second electrolytic solution container 213 and the pipe 209.

In the example shown in FIG. 4, the second electrolytic solution 205 contained in the second electrolytic solution container 213 passes through the second permeation preventing unit 216, the pipe 210, the valve 214, and the pump 215 and is supplied to the negative electrode chamber 122.

Consequently, the second redox species 206 dissolved in the second electrolytic solution 205 is oxidized or reduced by the second electrode 102.

Subsequently, the second electrolytic solution 205 containing the oxidized or reduced second redox species 206 passes through the pipe 209 and the permeation preventing unit 217 and is supplied to the second electrolytic solution container 213.

Consequently, the second redox species 206 dissolved in the second electrolytic solution 205 is oxidized or reduced by the second active material 204.

The valve 214 or the pump 215 controls the circulation of the second electrolytic solution 205. That is, the valve 214 or the pump 215 appropriately starts the supply of the second electrolytic solution 205, stops the supply, or controls, for example, the supply rate.

The circulation of the second electrolytic solution 205 may be controlled by a means other than the valve 214 or the pump 215.

In FIG. 4, the first electrode 101 is denoted as the positive electrode and the second electrode 102 is denoted as the negative electrode, as an example.

If the second electrode 102 has a relatively high potential, the first electrode 101 can serve as a negative electrode.

That is, the first electrode 101 may be a negative electrode, and the second electrode 102 may be a positive electrode.

The electrolytic solutions in the positive electrode chamber 121 and the negative electrode chamber 122 separated by the separator 103 may have different compositions from each other.

Alternatively, the electrolytic solutions in the positive electrode chamber 121 and the negative electrode chamber 122 may have the same composition.

Example 2

Example 2 using the redox flow battery 2100 having a structure according to Embodiment 4 will now be described.

Into a first tank, 6 mg of a lithium iron phosphate (LiFePO$_4$) powder in the charged state was put as the first active material 104.

Into the first tank, 5 cc of a first nonaqueous electrolytic solution was further put as the first electrolytic solution 105.

The solvent used for the first nonaqueous electrolytic solution was a nonaqueous solvent mixture of propylene carbonate and ethylene carbonate at a volume ratio of 1:1.

The first nonaqueous electrolytic solution was prepared by dissolving LiBF$_4$ in the nonaqueous solvent at a concentration of 1 mol/L.

Tetrathiafulvalene {(TTF)(BF$_4$)$_2$} in the charged state was dissolved as the first redox species 106 at a concentration of 10 mM in terms of TTF in the first nonaqueous electrolytic solution serving as the first electrolytic solution 105.

Into a second tank, 5 mg of a vanadium oxide (V$_2$O$_5$) powder was put as the second active material 204.

Into the second tank, 5 cc of a second nonaqueous electrolytic solution was further put as the second electrolytic solution 205.

The solvent used for the second nonaqueous electrolytic solution was a nonaqueous solvent mixture of propylene carbonate and ethylene carbonate at a volume ratio of 1:1.

The second nonaqueous electrolytic solution was prepared by dissolving LiBF$_4$ in the nonaqueous solvent at a concentration of 1 mol/L.

9,10-Phenanthrenequinone was dissolved as the second redox species 206 at a concentration of 10 mM in the second nonaqueous electrolytic solution serving as the second electrolytic solution 205.

The first electrode 101 and the second electrode 102 were each produced by press-bonding a mixture of carbon black and a PTFE binder to aluminum mesh with an area of 1 cm$^2$.

The separator 103 (diaphragm) used was polypropylene nonwoven fabric. The polypropylene nonwoven fabric was impregnated with a nonaqueous electrolytic solution containing 1 mol/L LiBF$_4$.

The first tank and the first electrode 101 were connected to each other with a silicon tube such that the first nonaqueous electrolytic solution circulates.

The second tank and the second electrode 102 were connected to each other with a silicon tube such that the second nonaqueous electrolytic solution circulates.

The redox flow battery of Example 2 was produced by the method described above.

Comparative Example 2

Comparative Example 2 will now be described.

The lithium iron phosphate (LiFePO$_4$) powder as the first active material 104 was not put in the first tank.

The vanadium oxide (V$_2$O$_5$) powder as the second active material 204 was not put in the second tank.

Except for the above, a redox flow battery of Comparative Example 2 was produced as in Example 2.

Charge and Discharge Test

In the redox flow batteries in Example 2 and Comparative Example 2, the first nonaqueous electrolytic solution was sent between the first tank and the first electrode 101 at a rate of 100 cc/min with a tube pump.

In the redox flow batteries in Example 2 and Comparative Example 2, the second nonaqueous electrolytic solution was sent between the second tank and the second electrode 102 at a rate of 100 cc/min with a tube pump.

The redox flow batteries of Example 1 and Comparative Example 1 were discharged at a constant current of 0.1 mA down to 0 V.

The redox flow battery of Comparative Example 1 was capable of being discharged for about 4 hours.

In contrast, the redox flow battery of Example 2 was capable of being discharged for about 8 hours. That is, it was demonstrated that the discharge capacity was increased in Example 2 compared to Comparative Example 2.

The redox flow batteries were subsequently charged at a constant current of 0.1 mA up to 1 V.

The redox flow battery of Comparative Example 2 was capable of being charged for about 4 hours.

In contrast, the redox flow battery of Example 1 was capable of being charged for about 8 hours. That is, it was demonstrated that the charge capacity was increased in Example 1 compared to Comparative Example 1.

The above-described results demonstrate that the first redox species 106 was discharged and charged by the first active material 104.

The above-described results demonstrate that the second redox species 206 was discharged and charged by the second active material 204.

The redox flow battery of the present disclosure can be suitably used as, for example, an electric storage device for power leveling to be used in combination with a power plant of, for example, thermal power generation, wind power generation, or fuel cell power generation; an emergency storage system for a general house or a multiple dwelling house; a power supply, such as a midnight power storage system; and a power supply, such as an uninterruptible power supply.

What is claimed is:

1. A redox flow battery comprising:
   a first electrode;
   a second electrode;
   a separator separating the first electrode and the second electrode;
   a first active material;
   a first electrolytic solution containing a first redox species; and
   a first circulation mechanism, wherein
   the first active material is insoluble in the first electrolytic solution;
   the first circulation mechanism is configured to circulate the first electrolytic solution between the first electrode and the first active material;
   the first redox species is configured to perform oxidation and reduction at the first electrode;
   the first redox species is configured to be oxidized and reduced by the first active material;
   the first circulation mechanism includes a first electrolytic solution container and a first permeation preventer;
   the first active material is contained in the first electrolytic solution container;
   the first electrolytic solution is configured to be brought into contact with the first active material in the first electrolytic solution container to oxidize and reduce the first redox species by the first active material;
   the first permeation preventer abuts an outlet for the first electrolytic solution of the first electrolytic solution container;
   the first permeation preventer is disposed to be external to the first electrolytic solution container; and
   the first permeation preventer is configured to prevent permeation of the first active material, such that the first active material remains in the first electrolytic solution container.

2. The redox flow battery according to claim 1, wherein
   the first redox species is configured to be oxidized at the first electrode and is configured to be reduced by the first active material in a charged state; and
   the first redox species is configured to be reduced at the first electrode and is configured to be oxidized by the first active material in a discharged state.

3. The redox flow battery according to claim 1, wherein a redox potential region of the first redox species and a redox potential region of the first active material partially overlap each other.

4. The redox flow battery according to claim 3, wherein
the redox potential region of the first redox species has an upper limit higher than an upper limit of the redox potential region of the first active material; and
the redox potential region of the first redox species has a lower limit lower than a lower limit of the redox potential region of the first active material.

5. The redox flow battery according to claim 1, wherein the first redox species is an organic compound having oxidizing and reducing properties.

6. The redox flow battery according to claim 5, wherein the first redox species is an organic compound having multiple redox potentials.

7. The redox flow battery according to claim 1, wherein the first active material has properties of reversibly occluding and releasing an alkali metal ion or an alkaline earth metal ion.

8. The redox flow battery according to claim 7, wherein the first active material has properties of reversibly occluding and releasing lithium ions.

9. The redox flow battery according to claim 1, wherein the second electrode is an alkali metal or an alkaline earth metal.

10. The redox flow battery according to claim 9, wherein the second electrode is lithium.

11. The redox flow battery according to claim 1, further comprising:
a second active material;
a second electrolytic solution containing a second redox species; and
a second circulation mechanism, wherein
the second active material is insoluble in the second electrolytic solution;
the second circulation mechanism is configured to circulate the second electrolytic solution between the second electrode and the second active material;
the second redox species is configured to perform oxidation and reduction at the second electrode; and
the second redox species is configured to be oxidized and reduced by the second active material.

12. The redox flow battery according to claim 11, wherein
the second redox species is configured to be reduced at the second electrode and is configured to be oxidized by the second active material in a charged state; and
the second redox species is configured to be oxidized at the second electrode and is configured to be reduced by the second active material in a discharged state.

13. The redox flow battery according to claim 11, wherein
a redox potential region of the second redox species and a redox potential region of the second active material partially overlap each other.

14. The redox flow battery according to claim 13, wherein
the redox potential region of the second redox species has an upper limit higher than an upper limit of the redox potential region of the second active material; and
the redox potential region of the second redox species has a lower limit lower than a lower limit of the redox potential region of the second active material.

15. The redox flow battery according to claim 11, wherein
the second circulation mechanism includes a second electrolytic solution container;
the second active material is contained in the second electrolytic solution container; and
the second electrolytic solution is brought into contact with the second active material in the second electrolytic solution container to oxidize and reduce the second redox species by the second active material.

16. The redox flow battery according to claim 15, wherein
the second circulation mechanism includes a second permeation preventer;
the second permeation preventer is disposed adjacent an outlet for the second electrolytic solution of the second electrolytic solution container; and
the second permeation preventer is disposed to be external to the second electrolytic solution container; and
the second permeation preventer prevents permeation of the second active material.

17. The redox flow battery according to claim 11, wherein the second redox species is an organic compound having oxidizing and reducing properties.

18. The redox flow battery according to claim 17, wherein the second redox species is an organic compound having multiple redox potentials.

19. The redox flow battery according to claim 11, wherein the second active material has properties of reversibly occluding and releasing an alkali metal ion or an alkaline earth metal ion.

20. The redox flow battery according to claim 19, wherein the second active material has properties of reversibly occluding and releasing lithium ions.

* * * * *